United States Patent [19]

Breon et al.

[11] Patent Number: 4,997,411
[45] Date of Patent: Mar. 5, 1991

[54] CAGE AND RETAINER COMBINATION FOR CHECK VALVES AND SLACK ADJUSTERS USING SAME

[75] Inventors: Mark S. Breon, Battle Creek, Mich.; Mark M. Wigsten, Ithaca, N.Y.

[73] Assignee: Eaton Corporation, Cleveland, Ohio

[21] Appl. No.: 471,579

[22] Filed: Jan. 29, 1990

[51] Int. Cl.⁵ ............................................. F16H 7/08
[52] U.S. Cl. .................................... 474/110; 474/138
[58] Field of Search ............................. 474/109–111, 474/113, 117, 133, 135, 136, 138

[56] References Cited

U.S. PATENT DOCUMENTS

| | | | |
|---|---|---|---|
| 4,695,268 | 9/1987 | Kodama et al. | 474/110 |
| 4,741,299 | 5/1988 | Matsuura et al. | 474/110 X |
| 4,772,251 | 9/1988 | Goppelt et al. | 474/138 X |
| 4,894,047 | 1/1990 | Breon et al. | 474/110 X |

Primary Examiner—Thuy M. Bui
Attorney, Agent, or Firm—A. E. Chrow

[57] ABSTRACT

A slack adjuster (500) is provided that is particularly advantageous for use in tensioning vehicular timing belts or chains. Adjuster (500) has substantially coaxially aligned status plunger (48), dynamic plunger (74), and sleeve (66). A first check valve (56) controls fluid flow between a first low pressure fluid reservoir or chamber (50) on plunger (48) and a second fluid chamber (84) in plunger (74). A second check valve (80) controls fluid flow between chamber (84) and a third fluid chamber in sleeve 66 includes a passageway (84) and also operates to prevent air from re-entering chamber (82) from passsageway (84).

9 Claims, 2 Drawing Sheets

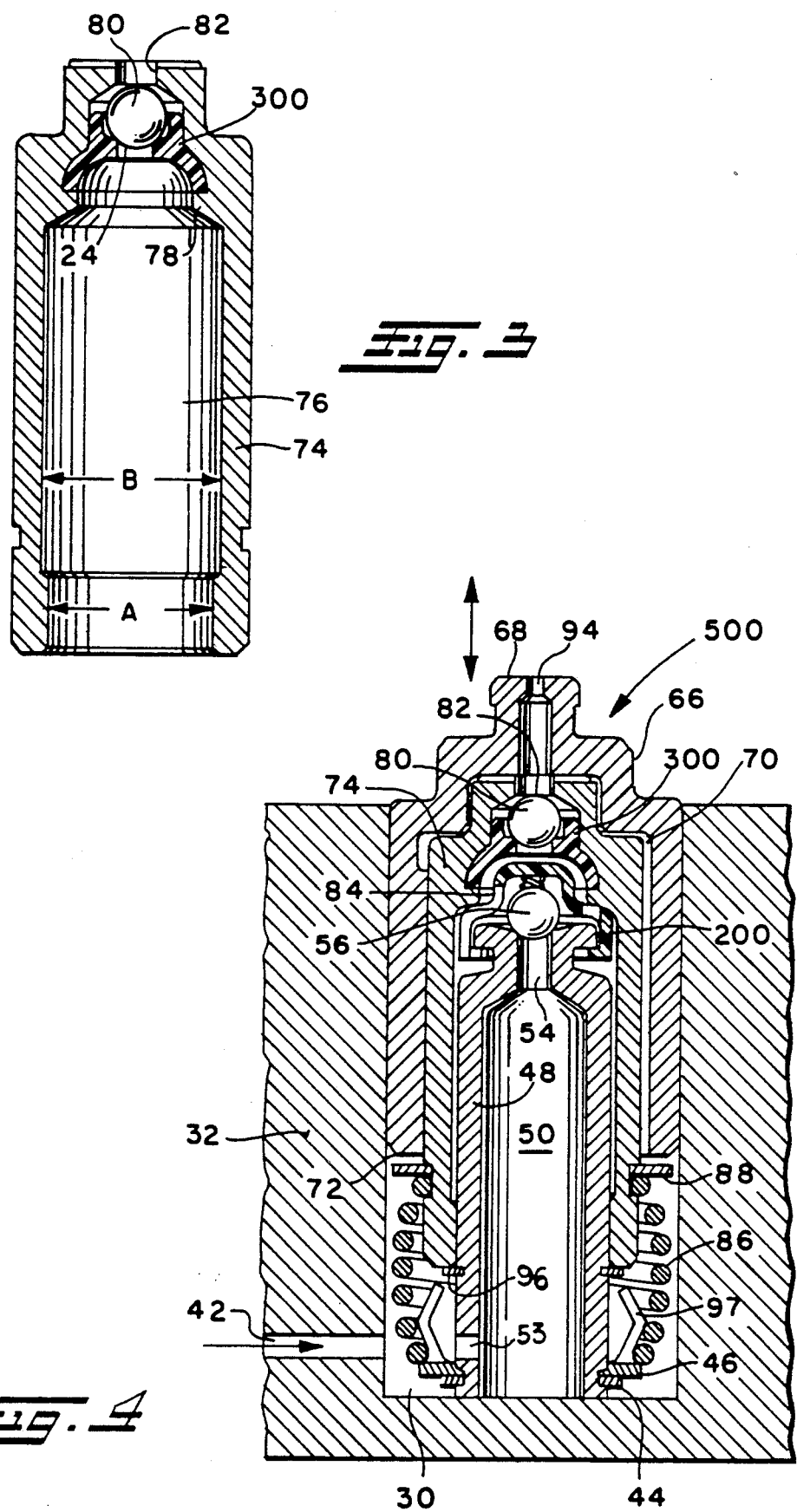

CAGE AND RETAINER COMBINATION FOR CHECK VALVES AND SLACK ADJUSTERS USING SAME

INTRODUCTION

This invention relates generally to a combination of cage and a retainer for holding a pair of check valves in registration with a fluid passageway in a fluid-operated device that is inexpensive to manufacture, easy to install, and highly effective in controlling fluid flow such as in a fluid-operated lash adjuster or belt or chain tensioning device for a vehicular engine and is additionally advantageously adapted to prevent vented air from re-entering the fluid.

BACKGROUND OF THE INVENTION

Cages have been used for many years to hold check valves in registration with fluid passageways for controlling the flow of fluid, commonly pressurized fluid, therethrough.

Fluid-operated devices, particularly slack-adjusting devices, have employed such cages for many years for enabling a check valve to control pressurized, incompressible, fluid flow into a semi-chamber which changes in volume due to the movement of a spring-biased piston for a vehicular engine slack adjuster or chain or belt tensioner well known to those skilled in the art.

The cages in such devices have most commonly been held in place by featuring circular outwardly extending flanges that are adapted to rest in a recess surrounding the passageway for the fluid and are held thereagainst by means of a coiled spring.

Examples of prior art check valve cages employing such means to hold the cages in place in slack adjusting devices are disclosed in U.S. Pat. Nos. 4,098,240; 4,184,464; and 4,227,495, and examples employing such means for holding the cages in place in chain or belt tensioning devices are disclosed in U.S. Pat. Nos. 4,507,103; 4,713,044; and 4,708,696, the disclosures of all of which are incorporated herein by reference.

Although such cages may be utilized in the combination of the present invention, the cage is preferably of the type described in U.S. patent application Ser. No. 343,232, filed Apr. 26, 1989, now U.S. Pat. No. 4,894,047 and assigned to Eaton Corporation, in that it is held in place in an entirely different manner enabling elimination of the coiled spring and inwardly facing groove and/or retaining clip heretofore used for such purpose.

The present invention provides a combination of a cage, such as heretofore described, and a plunger having a retainer adapted to hold a second check valve in registration with the first check valve for enabling entrapped air to escape into a third chamber that includes an exit orifice for enabling entrapped air to escape therefrom.

SUMMARY OF THE INVENTION

Accordingly, it is an object of this invention to provide a cage for retaining a first check valve for controlling fluid flow between first and second fluid chambers in combination with a retainer operative to retain a second check valve in a manner effective to control fluid flow from the second chamber into a third chamber having an exit for venting entrapped air therefrom and for preventing the vented air from re-entering the second chamber from the third chamber.

It is another object of this invention to provide a fluid-operated slack-adjusting device, such as a vehicular engine lash adjuster or chain or belt tensioner, that employs a resilient cage for retaining a first check valve in combination with a retainer for retaining a second check valve in substantial registration therewith for controlling fluid flow between a second and a third fluid chamber and for preventing air from entering the second chamber from the third chamber.

BRIEF DESCRIPTION OF THE DRAWINGS

FIG. 3 is a central cross-sectional view of a dynamic plunger using the retainer of FIGS. 2A and 2B; and FIG. 4 is a central cross-sectional view of a slack-adjusting device using the dynamic plunger shown in FIG. 3.

DESCRIPTION OF SOME PREFERRED EMBODIMENTS

Figure 1A:
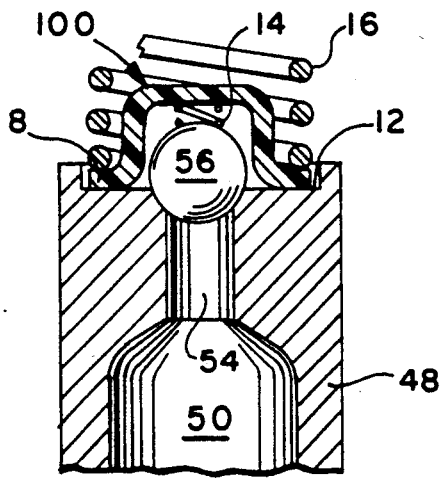
FIG. 1A is a partial cross-sectional view of one type of check valve cage that can be used to provide the combination of the invention.
Figure 1B:
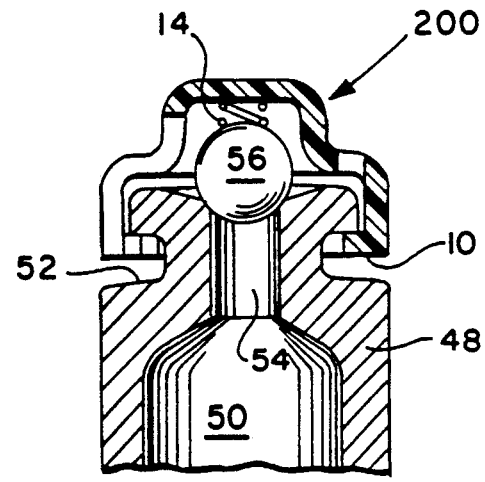
FIG. 1B is a partial cross-sectional view of a preferred type of check valve cage that can be used to provide the combination of the invention.
Figure 2A:
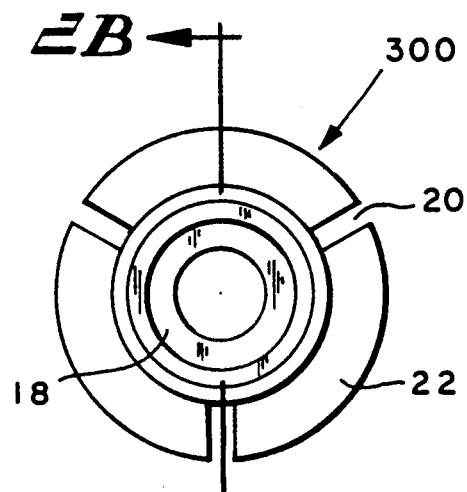
FIG. 2A is a top view of a preferred embodiment of a check valve retainer for use in combination with the cage of FIG. 1A or FIG. 1B.
Figure 2B:
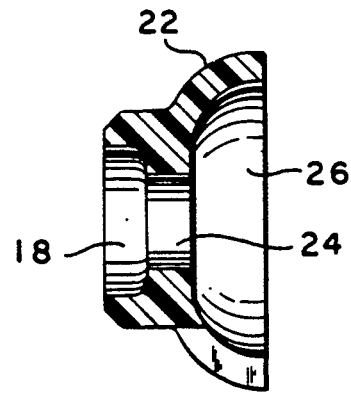
FIG. 2B is central cross-sectional view of the retainer of FIG. 2A taken along view line 2B—2B.

FIG. 1A and 1B respectively show two different types of check valve cages that can be used in combination with a second check valve retainer preferably of the type shown in FIGS. 2A and 2B.

Check valve cage 100 of FIG. 1A is a type well known in the art. Cage 100 has an inverted cup type configuration featuring a lower flange 8 that extends radially outwardly and is commonly pressed into an annular recess 12 on the top of static plunger 48. A coiled spring 16 that is restrained at one end (not shown) has an opposite end that bears against the upper annular surface of flange 8 and is operative to insure that cage 100 remains in annular recess 12 against the top of static plunger 48 that is hereinafter described in more detail with respect to FIG. 4. Cage 100 is adapted to contain and hold a check valve 56 such as spherical ball bearing in registration with a fluid passageway 54 communicating with a fluid chamber 50 within static plunger 48. Cage 100 is operative to enable check valve 56 to release from passageway 54 to enable fluid to flow from chamber 50 therethrough when the fluid pressure in chamber 50 exceeds the fluid pressure at the exit of passageway 54 and then to seat and seal the exit from passageway 54 when the pressure in chamber 50 falls below the fluid pressure at the exit from passageway 54. Cage 100 may further include a resilient member such as coiled spring 14 that is adapted to resiliently bear against the inner surface of the top of cage 100 and resiliently urge check valve 56 against the exit of passageway 54.

A preferred type of check valve cage 200 for use in combination with a second check valve retainer, preferably of the type shown in FIGS. 2A and 2B, is shown in FIG. 1B and is described in detail in previously described United States patent application Ser. No. 343,232 now U.S. Pat. No. 4,894,047. Rather than having a recessed annular upper surface, static plunger 48 is provided with an outwardly facing annular groove 52 adjacent the upper end thereof into which is received a radially inwardly extending flange 10 of cage 200 that is operative to cooperate with groove 52 to hold cage 200 onto the upper end of static plunger 48. Cage 200 may include a resilient member such as coiled spring 14 to resiliently hold check valve 56 against the exit of passageway 54 and is otherwise operative to control fluid flow through passageway 54 in the manner hereinbefore described for cage 100.

FIGS. 2A and 2B show a preferred embodiment of a retainer 300 to be used in combination with a check valve cage such as cage 100 or 200. Retainer 300 is substantially circular in plan view. Retainer 300 has a passageway 24 therethrough between an entrance end 26 and an exit end 18 adapted to hold a check valve in registration with passageway 24. Retainer 300 preferably includes three circumferentially evenly spaced slots 20 through the side wall that extend radially outwardly to divide it into three segments joined together at one end of the body of retainer 300 adjacent passageway 24. Entrance end 26 of retainer 300 is preferably cup-shaped as shown in FIG. 2B so as to nest co-axially in substantial registration with cage 200 as shown in FIG. 4.

Cage 200 and retainer 300 are preferably made from a resilient material suitable for the particular application and environment involved of which a suitably resilient nylon has been found to be particularly advantageous.

An intermediate dynamic plunger 74 used in a chain- or belt-tensioning device 500 of FIG. 4 is shown in FIG. 3. Plunger 74 has an open-ended bore 76 into which a portion of static plunger 48 of device 500 is received. Retainer 300 has been inserted and is supported by means such as inwardly extending annular flange 78 in the upper section of plunger 74 so as to enable it to hold a second check valve such as ball 80 in registration with passageway 24 between an exit opening 82 therefrom and bore 76.

Cage 200 preferably includes arcuate spaced-apart lips that extend radially outwardly from the base thereof. Bore 76 has an entrance diameter "A" adjacent the lower open end thereof adapted to enable the lips of cage 200 to flex as plunger 48 is inserted into the open (lower) end thereof and thence is enlarged to provide an internal diameter "B" adapted to enable the lips to straighten and return to their original radially outwardly extended condition to enable cage 200 to hold static plunger 48 within bore 76 of dynamic plunger 74. Diameter "B" is characteristically slightly larger than the maximum base diameter of cage 200 and also larger than the external diameter of static plunger 48 of FIG. 4 by an amount effective to prevent cage 200 from detaching from plunger 48 once plunger 48 is received into bore 76.

As shown in FIG. 4, dynamic plunger 74 is reciprocally disposed between static plunger 48 and a sleeve 66 that is operable to be received in and to move reciprocally within a closed-end bore 30 of body member 32 that may, for example, be an engine block.

Although sleeve 66 is preferred, embodiments of the invention include slack-adjusting devices that do not have the sleeve and employ the dynamic plunger directly for tensioning.

Sleeve 66 has an open-ended bore (not referenced) therein at an annular end 72 disposed in spaced apart facing relationship to a flange 46 such as an annular washer extending from static plunger 48 previously described. Sleeve 66 has an opposite exposed end 68 adapted to directly or indirectly engage and adjust slack in a belt or chain in response to reciprocal movement of dynamic plunger 74.

Device 500 preferably includes a system of clearances and and passages such as longitudinal groove 70 between sleeve 66 and dynamic plunger 74 that allows free flow of fluid from the vicinity of spring 86 to fluid passageway 94 for exiting device 500 thereat for lubricating, for example, a chain being tensioned by device 500.

Static plunger 48 is received into bore 76 of dynamic plunger 74 such that cage 200 and retainer 300 are in substantially aligned adjacent relationship, preferably a nested aligned relationship, and are axially spaced apart such that the region of bore 76 therebetween defines a second fluid chamber 84 and second passageway 82 and the portion of bore 70 between the end of plunger 74 facing towards exposed end 68 of sleeve 66 define a third fluid chamber into which fluid and/or air enters when it is vented past a second check valve 80 held in registration with passageway 82.

Means for holding static plunger 48 stationary relative sleeve 66 and plunger 74 while resiliently urging the dynamic plunger 74 and sleeve 66 outwardly from the body member bore in which they are disposed is preferably provided by flange 88 extending outwardly from plunger 74 between end 72 of plunger 74 and flange 46 supported by snap ring 44 extending outwardly from static plunger 48 and providing a resilient biasing member such as coiled spring 86 therebetween that operates to hold static plunger 48 stationarily against the bottom of bore 30 while urging dynamic plunger 74 and sleeve 66 outwardly therefrom.

Flange 46 may further include one and preferably a plurality of circumferentially spaced projections 97 that extend upwardly from the flange 46 and are shaped to provide a seat that is adapted to hold spring 86 against flange 46.

Check valve 80 is operable to move against passageway 82 and prevent fluid from flowing thereinto from second chamber 84 as long as fluid pressure in chamber 84 exceeds that in passageway 82 (part of the third fluid chamber) as well as move against retainer 300 and prevent air from re-entering chamber 84 from passageway whenever the fluid pressure in chamber 84 is less than the fluid pressure in passageway 82.

In operation, fluid flows through channel or passageway 42 through body member 32 and into bore 30 and thence through passageway 53 into first fluid chamber 50 in static plunger 48. When the fluid pressure in chamber 50 exceeds fluid pressure in chamber 84, the fluid will flow through passageway 54 and past check valve 56 into chamber 84. Spring force moves dynamic plunger 74 outwardly away from static plunger 48 until slack in the chain or belt is eliminated. As dynamic plunger 74 moves outwardly from bore 30, the volume of chamber 84 increases, creating a partial vacuum, enabling it to accept more fluid from chamber 50 which is also known in the trade as the "fluid reservoir".

Dynamic plunger 74 carries sleeve 66 outwardly from bore 30 as the volume of fluid in chamber 84 increases. However, since the end 68 of sleeve 66 is in direct or indirect contacting engagement with the belt or chain being tensioned, outward movement of sleeve 66 and dynamic plunger 74 will cease. The force upon sleeve 66 and dynamic plunger 74 arising from the belt or chain being tensioned will compress fluid chamber 84 and cause the fluid pressure to exceed that in reservoir 50 and cause check valve 56 to seal and provide fluid from flowing back into reservoir or chamber 50.

During the course of expansion and contraction of fluid chamber 84, retainer 300 and check valve 80 operate to enable a small amount of fluid and all entrapped air to exit into passageway 82 when the fluid pressure in chamber 84 exceeds that in chamber 82 and check valve 80 seals against retainer 300 to prevent the entrapped air from returning from passageway 82 to chamber 84 when the fluid pressure in passageway 82 exceeds that in chamber 84.

What is claimed is:

1. A combination of a cage and a retainer for controlling fluid flow from a first fluid chamber into a third fluid chamber through an intermediate second fluid chamber disposed therebetween;

said first and second chambers being separated by an end wall of a cylindrical member having a passageway therethrough providing fluid communication therebetween, said second and third chambers being separated by a wall having an opening therethrough providing fluid communication therebetween, said cage being disposed in the second chamber and secured to the wall between the first and second chambers and operative to receive a first check valve thereinto and hold said check valve in registration with the passageway, said cage having at least one aperture enabling fluid to flow between the first and second chambers therethrough, said cage being operable to enable the first check valve to move against the passageway to prevent the fluid from flowing from the first chamber into the second chamber when the fluid pressure in the second chamber exceeds the fluid pressure in the first chamber by a prescribed amount and to enable the first check valve to release from the passageway sufficiently to enable the fluid to flow from the first chamber into the second chamber when the fluid pressure in the first chamber exceeds the fluid pressure in the second chamber, and said retainer being supported in the second chamber intermediate the cage and the third chamber, said retainer having a passageway therethrough providing fluid communication between the second chamber and the opening through the wall between the second and third chambers and having an end thereof facing towards the third chamber adapted to support a second check valve in registration with the passageway, and said retainer operative to enable entrapped air to escape through the passageway therethrough from the second chamber and past the second check valve and into the third chamber as long as the fluid pressure in the second chamber exceeds the fluid pressure in the third chamber and to enable the second check valve to move against the opening through the wall between the second and third chambers to prevent the air from re-entering into the second chamber from the third chamber whenever the fluid pressure in the second chamber is less than the fluid pressure in the third chamber.

2. The combination of claim 1 wherein at least one of the cage and retainer includes a resilient member operable to resiliently urge the check valve against the passageway.

3. The combination of claim 2 wherein the resilient member is a coiled spring.

4. A fluid operated slack adjusting device comprising;

a body member having a bore therein having an open end and a closed end, a dynamic plunger having at least a portion thereof disposed in the body member bore, said dynamic plunger reciprocally movable relative the body member bore and having an exposed end and an opposite end having an open ended bore therein spaced-apart facing relationship with the body member bore closed end, a static plunger stationarily disposed in the body member bore, said plunger having a hollow interior defining a first fluid chamber therewithin and having a portion thereof extending into the dynamic plunger bore and ending in an end facing away from the body member bore closed-end that is in spaced-apart facing relationship with the dynamic plunger exposed end defining a second fluid chamber within the dynamic plunger bore therebetween, means disposed within the body member bore for holding the static plunger stationary relative thereto while resiliently urging the dynamic plunger outwardly therefrom to enable the exposed end thereof to adjust slack, means for conveying pressurized fluid through the body member into the first chamber, a passageway extending through the static plunger end providing fluid communication between the first and second chambers, a cage secured to the end of the static plunger having the passageway therethrough, said cage being operable to hold a first check valve in registration with the passageway between the first and second chambers for controlling fluid flow therebetween, said cage having at least one aperture enabling the fluid to flow between the first and second chambers therethrough, a retainer supported in the second chamber intermediate the cage and the dynamic plunger exposed end and defining a third fluid chamber therebetween, said retainer having a passageway therethrough providing fluid communication between the first, second and third chambers and having an end thereof facing towards the third chamber adapted to support a second check valve in registration with the passageway, an opening through the dynamic plunger exposed end, said cage operable to enable the first check valve to move against the passageway between the first and second chambers to prevent fluid from flowing from the first chamber into the second chamber when the fluid pressure in the second chamber exceeds the fluid pressure in the first chamber and to enable the check valve to release from said passageway and enable fluid to flow from the first chamber into the second chamber when the fluid pressure in the first chamber exceeds the fluid pressure in the second chamber, and said retainer being operable to enable entrapped air to escape through the passageway therethrough from the second chamber and past the second check valve and into the third chamber as long as the fluid pressure in the second chamber exceeds the fluid pressure in the third chamber and to enable second check valve to move against the opening through the end of the dynamic plunger to prevent the air from re-entering into the second chamber from the third chamber whenever the fluid pressure in the second chamber is less than the fluid pressure in the third chamber.

5. A fluid operated slack adjusting device comprising;

a body member having a bore therein having an open end and a closed end, a sleeve having at least a portion thereof disposed in the body member bore, said sleeve reciprocally movable relative the body member bore and having an exposed end and an opposite end having an open-ended bore therein in spaced apart facing relationship with the body member bore closed end, a dynamic plunger disposed in the body member bore, said plunger having an open-ended bore in one end facing towards the body member closed end and an opposite end extending into the sleeve bore, said plunger reciprocally movable relative the sleeve and body member bore, a static plunger stationarily disposed within the body member bore, said static plunger having a hollow interior defining a first fluid chamber therewithin and having a portion thereof extending into the dynamic plunger bore and ending in an opposite end facing away from the body member bore closed end that is in spaced apart facing relationship with the exposed end of the sleeve bore therebetween, means disposed within the body member bore for holding the static plunger stationary relative thereto whilst urging the sleeve outwardly therefrom to enable the exposed end thereof to adjust slack, means for conveying pressurized fluid through the body member into the first chamber, a passageway extending through the static plunger opposite end providing fluid communication between the first and second chambers, a cage secured to the static plunger operative to hold a first check valve in registration with the passageway between the first and second chambers for controlling fluid flow therebetween, said cage having at least one aperture enabling the fluid to flow between the first and second chambers therethrough, a retainer supported in the second chamber intermediate the cage and a third fluid chamber defined within the dynamic plunger between the retainer and the dynamic plunger opposite end, said retainer having a passageway therethrough providing fluid communication between the second and third chambers and having an end thereof facing towards the third chamber adapted to support a second check valve in registration with the passageway, said cage operable to enable the first check valve to move against the passageway between the first and second chamber to prevent fluid from flowing from the first chamber into the second chamber when the fluid pressure in the second chamber exceeds the fluid pressure in the first chamber and to enable the check valve to release from said passageway and enable fluid to flow from the first chamber into the second chamber when the fluid pressure in the first chamber exceeds the fluid pressure in the second chamber, and said retainer being operable to enable entrapped air to escape through the passageway therethrough from the second chamber and past the second check valve and into the third chamber as long as the fluid pressure in the second chamber exceeds the fluid pressure in the third chamber and to enable the second check valve to move against the opening through the end of the dynamic plunger facing towards the exposed end of the sleeve to prevent the air from re-entering into the second chamber from the third chamber whenever the fluid pressure in the second chamber is less than the fluid pressure in the third chamber.

6. The device of claim 4 or 5 at least one of the gage or retainer includes a resilient member operable to resiliently urge the check valve against the passageway.

7. The combination of claim 6 wherein the resilient member is a coiled spring.

8. The device of claim 5 wherein the exposed end of the sleeve includes an opening therethrough communicating with the third chamber and adapted to enable the fluid and entrapped air to flow therefrom.

9. The device of claim 4 or 5 wherein the means disposed within the body member bore for holding the static plunger stationary relative thereto is provided by said static plunger including a flange extending radially outwardly therefrom within the body member bore proximate the closed end thereof and a coiled spring disposed about the static plunger and having one end engaging the flange and an opposite end engaging the dynamic plunger and operable to move the dynamic plunger outwardly from the body member bore while holding the static plunger against the closed end thereof.

* * * * *

UNITED STATES PATENT AND TRADEMARK OFFICE
CERTIFICATE OF CORRECTION

PATENT NO. : 4,997,411

DATED : March 5, 1991

INVENTOR(S) : Mark S. Breon and Mark M. Wigsten

It is certified that error appears in the above-identified patent and that said Letters Patent is hereby corrected as shown below:

Title Page:  Item [73]
Assignee:  Eaton Corporation, Cleveland, Ohio and

Borg-Warner Automotive, Inc., Troy, Michigan
(Part Interest)

Signed and Sealed this

Thirteenth Day of October, 1992

Attest:

DOUGLAS B. COMER

*Attesting Officer*   Acting Commissioner of Patents and Trademarks